(12) United States Patent
Matano

(10) Patent No.: US 10,954,362 B2
(45) Date of Patent: Mar. 23, 2021

(54) RESIN COMPOSITION FOR THREE-DIMENSIONAL FORMING

(71) Applicant: NIPPON ELECTRIC GLASS CO., LTD., Otsu (JP)

(72) Inventor: Takahiro Matano, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 298 days.

(21) Appl. No.: 15/542,108

(22) PCT Filed: Mar. 17, 2016

(86) PCT No.: PCT/JP2016/058575
§ 371 (c)(1),
(2) Date: Jul. 7, 2017

(87) PCT Pub. No.: WO2016/158468
PCT Pub. Date: Oct. 6, 2016

(65) Prior Publication Data
US 2018/0273729 A1 Sep. 27, 2018

(30) Foreign Application Priority Data

Mar. 31, 2015 (JP) .............................. JP2015-071474

(51) Int. Cl.
| C03C 13/00 | (2006.01) |
| C08K 7/20 | (2006.01) |
| C08K 3/40 | (2006.01) |
| B33Y 70/00 | (2020.01) |
| B33Y 10/00 | (2015.01) |
| C08K 3/20 | (2006.01) |
| C08L 101/00 | (2006.01) |
| B29C 64/135 | (2017.01) |
| B29K 509/08 | (2006.01) |

(52) U.S. Cl.
CPC .............. *C08K 7/20* (2013.01); *B29C 64/135* (2017.08); *B33Y 10/00* (2014.12); *B33Y 70/00* (2014.12); *C08K 3/20* (2013.01); *C08K 3/40* (2013.01); *C08L 101/00* (2013.01); *B29K 2509/08* (2013.01); *C08K 2201/005* (2013.01); *C08K 2201/006* (2013.01)

(58) Field of Classification Search
CPC ...... C08K 7/20; C08K 3/40; C08K 2201/006; C08K 2201/005; C08K 3/20; B29C 64/135; B33Y 10/00; B33Y 70/00; B29K 2509/08; C08L 101/00
See application file for complete search history.

(56) References Cited

U.S. PATENT DOCUMENTS

| 4,152,511 A * | 5/1979 | Bier ........................ C07C 69/92 525/36 |
| 4,182,696 A * | 1/1980 | Wynstra ................... C08G 8/00 524/14 |
| 4,297,141 A * | 10/1981 | Tokunaga ................ C08K 3/36 501/67 |
| 5,679,722 A | 10/1997 | Tamura |
| 2003/0173714 A1 | 9/2003 | Ueno |
| 2005/0282001 A1* | 12/2005 | Jenkines ..................... C08J 5/00 428/323 |
| 2008/0044488 A1* | 2/2008 | Zimmer .................. B82Y 30/00 424/600 |
| 2012/0251841 A1* | 10/2012 | Southwell ............ G03F 7/0037 428/704 |
| 2016/0083557 A1* | 3/2016 | Masuda .................. C03C 3/097 523/466 |

FOREIGN PATENT DOCUMENTS

| CN | 1443636 A | 9/2003 |
| CN | 103524022 A | 1/2014 |
| JP | 04-247006 A | 9/1992 |
| JP | 07-026060 A | 1/1995 |
| JP | 07-026062 A | 1/1995 |
| JP | 2001-031879 A | 2/2001 |
| JP | 2001-201500 A | 7/2001 |
| JP | 2003-266547 A | 9/2003 |
| JP | 2008-500935 A | 1/2008 |
| WO | 2014/188991 A1 | 11/2014 |

OTHER PUBLICATIONS

Translated PCT Written Opinion dated May 17, 2016 (Year: 2016).*
English language translation of JP 2008-260669, pp. 1-3, Sep. 9, 2019.*
English language translation of JP 2007-091577, pp. 1-68, Sep. 9, 2019.*
Official Communication issued in International Patent Application No. PCT/JP2016/058575, dated May 17, 2016.
Official Communication issued in Chinese Patent Application No. 201680018461.9, dated Jul. 3, 2019.

* cited by examiner

*Primary Examiner* — Alexander C Kollias
(74) *Attorney, Agent, or Firm* — Keating and Bennett, LLP

(57) ABSTRACT

Provided is a resin composition for three-dimensional modeling that can accurately fabricate a three-dimensional modeled object capable of being matched in coefficient of thermal expansion with surrounding members when used as a component in various devices. The resin composition for three-dimensional modeling contains a curable resin and a glass filler, the glass filler having a coefficient of thermal expansion of $60 \times 10^{-7}/°$C. or less at −40 to 50° C. and compositionally containing 90% by mass or less $SiO_2$.

10 Claims, No Drawings

RESIN COMPOSITION FOR THREE-DIMENSIONAL FORMING

TECHNICAL FIELD

The present invention relates to resin compositions for three-dimensional modeling and methods for the production of three-dimensional modeled objects using the same.

BACKGROUND ART

There are heretofore known methods for obtaining a three-dimensional modeled object by depositing layers of a resin material or other materials one on top of another. Various such methods, including, for example, stereolithography, powder bed fusion, fused deposition modeling (FDM), are proposed and put into practical use (see, for example, Patent Literature 1).

Among them, stereolithography is excellent in detailed shape forming and accurate size reproduction and is therefore in widespread use. Stereolithography is a method for fabricating a three-dimensional modeled object in the following manner. A modeling stage is first provided in a tank filled with a liquid photocurable resin and the photocurable resin on top of the modeling stage is then irradiated with active energy rays, such as an ultraviolet laser, to form a cured layer having a desired pattern. When the one cured layer is formed in this manner, the modeling stage is lowered by one layer thickness to introduce uncured photocurable resin on top of the cured layer and the photocurable resin is likewise irradiated with active energy rays to deposit a new cured layer on top of the previous cured layer. By repeating this process, a predetermined three-dimensional modeled object is obtained. Powder bed fusion is a method in which a modeling stage is provided in a tank filled with powder of resin, metal, ceramic or glass and the powder on top of the modeling stage is irradiated with active energy rays to become softened and deformed and then formed into a solidified layer having a desired pattern.

CITATION LIST

Patent Literature

[PTL 1]
JP-A-H07-26060

SUMMARY OF INVENTION

Technical Problem

Three-dimensional modeled objects obtained by the above methods are required to be matched in coefficient of thermal expansion with surrounding members (for example, metal), for example, when used as components of various measurement devices and thermal regulators. Furthermore, such components often have complicated shapes and, therefore, they are difficult to accurately fabricate by the above methods.

In view of the foregoing, the present invention has an object of providing a resin composition for three-dimensional modeling that can accurately fabricate a three-dimensional modeled object capable of being matched in coefficient of thermal expansion with surrounding members when used as a component in various devices.

Solution to Problem

A resin composition for three-dimensional modeling according to the present invention is a resin composition for three-dimensional modeling containing a curable resin and a glass filler, the glass filler having a coefficient of thermal expansion of $60 \times 10^{-7}/°$ C. or less at −40 to 50° C. and compositionally containing 90% by mass or less $SiO_2$.

Generally, resin has a large coefficient of thermal expansion and, therefore, significantly deforms its dimension with changes in temperature. Unlike this, since the resin composition for three-dimensional modeling according to the present invention contains a glass filler having a coefficient of thermal expansion as low as $60 \times 10^{-7}/°$ C. or less, the dimensional deformation of the resin composition can be reduced and, therefore, the resultant three-dimensional modeled object has high dimensional stability.

Meanwhile, if the content of filler in the resin composition is increased for the purpose of increasing the mechanical strength of the resultant three-dimensional modeled object, the fluidity of the resin composition decreases, which makes it difficult to accurately fabricate a three-dimensional modeled object having a complicated shape. However, since in the present invention the glass filler having a $SiO_2$ content of 90% by mass or less is used as a filler, the resin composition can be easily formed into a shape less likely to decrease the fluidity, such as a sphere. Therefore, even if the filler is contained much in the resin composition, a three-dimensional modeled object can be accurately fabricated.

In the resin composition for three-dimensional modeling according to the present invention, the glass filler preferably has a specific surface area three times or less a theoretical specific surface area represented by the following equation:

$$\text{theoretical specific surface area } (m^2/g) = 6/(\text{density } (g/cm^3) \times \text{average particle size } D50 \text{ } (\mu m)).$$

The theoretical specific surface area is a specific surface area when the glass filler is assumed to have the shape of a sphere having a diameter of an average particle size $D_{50}$. When the specific surface area of the glass filler is defined to be as small as three times or less the theoretical specific surface area, the surface asperity of the glass filler is small, so that the fluidity of the resin composition can be easily increased.

In the resin composition for three-dimensional modeling according to the present invention, the glass filler is preferably approximately spherical. Thus, the fluidity of the resin composition can be more easily increased.

In the resin composition for three-dimensional modeling according to the present invention, the glass filler preferably compositionally contains, in % by mass, 30 to 85% $SiO_2$, 0 to 30% $Al_2O_3$, 0 to 50% $B_2O_3$, and 0.01 to 10% $Li_2O+Na_2O+K_2O$. Thus, the softening point of the glass filler decreases, so that the formability can be easily increased. As used herein, "$Li_2O+Na_2O+K_2O$" means the total content of these components.

In the resin composition for three-dimensional modeling according to the present invention, the glass filler preferably compositionally contains, in % by mass, 55 to 75% $SiO_2$, 15 to 30% $Al_2O_3$, 2 to 10% $Li_2O$, 0 to 3% $Na_2O$, 0 to 3% $K_2O$, 0 to 5% MgO, 0 to 10% ZnO, 0 to 5% BaO, 0 to 5% $TiO_2$, 0 to 4% $ZrO_2$, 0 to 5% $P_2O_5$, and 0 to 2.5% $SnO_2$. Thus, the coefficient of thermal expansion of the glass filler can be easily lowered.

In the resin composition for three-dimensional modeling according to the present invention, the glass filler preferably has a content of each of lead, mercury, chromium, cadmium, fluorine, and arsenic of 0.01% by mass or less. Thus, an environmentally preferred three-dimensional modeled object can be obtained.

In the resin composition for three-dimensional modeling according to the present invention, the glass filler preferably has a softening point of 1200° C. or less. Thus, the resin composition can be easily formed into a sphere or the like.

In the resin composition for three-dimensional modeling according to the present invention, the glass filler preferably has a light transmittance of 5% or more at a wavelength of 400 nm. Thus, when stereolithography is employed, active energy rays easily penetrates into the resin composition, so that the production efficiency can be easily increased.

In the resin composition for three-dimensional modeling according to the present invention, crystals preferably precipitate in the glass filler (the glass filler is preferably a crystallized glass). Thus, the coefficient of thermal expansion of the glass filler can be lowered. Therefore, the coefficient of thermal expansion of the resultant three-dimensional modeled object also becomes lower, so that the dimensional stability can be improved.

In the resin composition for three-dimensional modeling according to the present invention, a photocurable resin or a thermosetting resin may be used as the curable resin.

The resin composition for three-dimensional modeling according to the present invention preferably contains, in % by volume, the curable resin in a proportion of 30 to 99% and the glass filler in a proportion of 1 to 70%.

A method for producing a three-dimensional modeled object according to the present invention includes: selectively irradiating a liquid layer made of a resin composition with active energy rays to form a cured layer having a predetermined pattern; forming a new liquid layer on top of the cured layer, followed by irradiation of active energy rays to form a new cured layer having a predetermined pattern continuous with the cured layer; and repeating deposition of the cured layers one on top of another until a predetermined three-dimensional modeled object is obtained, wherein the above-described resin composition for three-dimensional modeling is used as the resin composition.

Advantageous Effects of Invention

The present invention enables provision of a resin composition for three-dimensional modeling that can accurately fabricate a three-dimensional modeled object capable of being matched in coefficient of thermal expansion with surrounding members when used as a component in various devices.

DESCRIPTION OF EMBODIMENTS

A resin composition for three-dimensional modeling according to the present invention contains a curable resin and a glass filler. The content rates of these components are, in % by volume, preferably 30 to 99% curable resin and 1 to 70% glass filler. The content of the curable resin is more preferably 35 to 95%, still more preferably 40 to 90%, and particularly preferably 45 to 85%. The content of the glass filler is more preferably 5 to 65%, still more preferably 10 to 60%, and particularly preferably 15 to 55%. If the content of the glass filler is too small, the effect of increasing the mechanical strength becomes difficult to achieve. On the other hand, also if the content of the glass filler is too large, the mechanical strength of the resultant three-dimensional modeled object tends to be low because the contact area of each glass filler particle with the curable resin becomes small. Furthermore, in the case of stereolithography, the viscosity of the resin composition becomes too high, so that inconveniences become likely to occur, such as the difficulty of forming a new liquid layer on top of a modeling stage.

The curable resin for use in the present invention may be either a photocurable resin or a thermosetting resin and can be appropriately selected from them depending on the employed modeling method. For example, when stereolithography is used, a liquid photocurable resin can be selected. For another example, when powder bed fusion is employed, a powdered thermosetting resin can be selected.

The photocurable resin can be selected from various types of photocurable resins, including polymerizable vinyl compounds and epoxy compounds. Furthermore, monomers and oligomers of monofunctional compounds and polyfunctional compounds may be used. No particular limitation is placed on the types of these monofunctional compounds and polyfunctional compounds. The following are typical examples of such photocurable resins.

Examples of monofunctional, polymerizable vinyl compounds include isobornyl acrylate, isobornyl methacrylate, dicyclopentenyl acrylate, bornyl acrylate, bornyl methacrylate, 2-hydroxyethyl acrylate, 2-hydroxypropyl acrylate, propylene glycol acrylate, vinylpyrrolidone, acrylamide, vinyl acetate, and styrene. Examples of polyfunctional, polymerizable vinyl compounds include trimethylolpropane triacrylate, EO-modified trimethylolpropane triacrylate, ethylene glycol diacrylate, tetraethylene glycol diacrylate, polyethylene glycol diacrylate, 1,4-butanediol diacrylate, 1,6-hexanediol diacrylate, neopentyl glycol diacrylate, dicyclopentenyl diacrylate, polyester diacrylate, and diallyl phthalate. One or more of these monofunctional compounds and polyfunctional compounds can be used alone or in a mixture thereof.

A photo-polymerization initiator can be used as a polymerization initiator for the vinyl compound. Typical examples of such photo-polymerization initiators include 2,2-dimethoxy-2-phenylacetophenone, 1-hydroxycyclohexyl phenyl ketone, acetophenone, benzophenone, xanthone, fluorenone, benzaldehyde, fluorene, anthraquinone, triphenylamine, carbazole, 3-methylacetophenone, and Michler's ketone. These initiators can be used alone or in combination of two or more. As necessary, a sensitizer, such as an amine compound, may be used in combination. The amount of each of these polymerization initiators used is preferably 0.1 to 10% by mass relative to the vinyl compound.

Examples of epoxy compounds include hydrogenated bisphenol A diglycidyl ether, 3,4-epoxycyclohexylmethyl-3,4-epoxycyclohexane carboxylate, 2-(3,4-epoxycyclohexyl-5,5-spiro-3,4-epoxy)cyclohexane-m-dioxane, and bis (3,4-epoxycyclohexylmethyl)adipate. In the case of using these epoxy compounds, an energy-activatable cationic initiator, such as triphenylsulfonium hexafluoroantimonate may be used.

Furthermore, as necessary, a leveling agent, a surfactant, an organic polymer, an organic plasticizer and/or so on may be added to the photocurable resin.

The glass filler for use in the present invention has the feature that it has a coefficient of thermal expansion of $60 \times 10^{-7}$/° C. or less at −40 to 50° C. and compositionally contains 90% by mass or less $SiO_2$. Thus, the coefficient of thermal expansion of the resultant three-dimensional modeled object can be lowered and the resin composition can be easily formed into a shape less likely to decrease the fluidity, such as a sphere. A description will be given below of specific compositions of the glass filler. In the description relating to the content of each of the following components, "%" refers to % by mass unless otherwise noted.

(Glass Composition A)

The glass filler that can be used is one compositionally containing, in % by mass, 30 to 85% $SiO_2$, 0 to 30% $Al_2O_3$, 0 to 50% $B_2O_3$, and 0 to 10% $Li_2O+Na_2O+K_2O$. The reasons why the glass composition is restricted as above are described below.

$SiO_2$ is a component for forming the glass network and has the effect of easily increasing the chemical durability and the effect of reducing denitrification. The $SiO_2$ content is preferably 30 to 85%, more preferably 40 to 75%, and particularly preferably 45 to 70%. If $SiO_2$ is too less, the above effects become difficult to achieve. On the other hand, if $SiO_2$ is too much, the softening point becomes high, so that the formability tends to become poor.

$Al_2O_3$ is a component for stabilizing vitrification. Furthermore, $Al_2O_3$ is highly effective to increase the chemical durability. The $Al_2O_3$ content is preferably 0 to 30%, more preferably 2.5 to 25%, and particularly preferably 5 to 20%. If $Al_2O_3$ is too much, the softening point rises to make the glass less formable. Furthermore, the meltability and chemical durability are likely to decrease and the glass is likely to denitrify.

$B_2O_3$ is a component for forming the glass network. Furthermore, $B_2O_3$ has the effect of easily increasing the chemical durability and the effect of reducing denitrification. The $B_2O_3$ content is preferably 0 to 50%, more preferably 2.5 to 40%, and particularly preferably 5 to 30%. If the $B_{203}$ content is too large, the meltability is likely to decrease and the glass is less likely to soften during forming, which creates difficulty in production.

$Li_2O$, $Na_2O$, and $K_2O$ are components for lowering the softening point and facilitating forming. The content of $Li_2O+Na_2O+K_2O$ is preferably 0 to 10%, more preferably 0.01 to 9%, still more preferably 0.1 to 8%, and particularly preferably 1 to 7%. If $Li_2O+Na_2O+K_2O$ is too much, the coefficient of thermal expansion is likely to become higher and the chemical durability is likely to decrease. The content of each component of $Li_2O$, $Na_2O$, and $K_2O$ is also preferably in the above range.

In addition to the above components, the following components may be incorporated into the glass filler.

MgO, CaO, SrO, BaO, and ZnO are components for decreasing the viscosity without largely decreasing the chemical durability. The content of these components is, in total, preferably 0 to 50%, more preferably 0.1 to 50%, still more preferably 1 to 40%, and particularly preferably 2 to 30%. If the content of these components is too large, the glass is likely to denitrify.

$P_2O_5$ is a component for forming the glass network, has the effect of easily increasing the light transmittance and the chemical durability, and also has the effect of reducing denitrification. The $P_2O_5$ content is preferably 0 to 50%, more preferably 2.5 to 40%, and particularly preferably 5 to 30%. If $P_2O_5$ is too much, the meltability is likely to decrease. In addition, the weather resistance is likely to decrease. On the other hand, if $P_2O_5$ is too less, the glass is likely to denitrify.

(Glass Composition B)

A glass filler that can be used is one compositionally containing, in % by mass, 55 to 75% $SiO_2$, 15 to 30% $Al_2O_3$, 2 to 10% $Li_2O$, 0 to 3% $Na_2O$, 0 to 3% $K_2O$, 0 to 5% MgO, 0 to 10% ZnO, 0 to 5% BaO, 0 to 5% $TiO_2$, 0 to 4% $ZrO_2$, 0 to 5% $P_2O_5$, and 0 to 2.5% $SnO_2$. The glass filler having the above composition has the property of, when heated at or above its crystallization onset temperature, precipitating β-quartz solid solution and/or β-eucryptite which have low expansion characteristics.

The reasons why the glass composition is restricted as above are described below.

$SiO_2$ is a component for forming the glass network and becomes a constituent of the crystal. The $SiO_2$ content is preferably 55 to 75% and particularly preferably 60 to 75%. If $SiO_2$ is too less, the coefficient of thermal expansion tends to become higher and the chemical durability tends to decrease. On the other hand, if $SiO_2$ is too much, the meltability is likely to decrease. Furthermore, the viscosity of the molten glass tends to increase, which makes it difficult to clarify the glass and makes it difficult to form the molten glass into shape.

$Al_2O_3$ is a component for forming the glass network and becomes a constituent of the crystal. The $Al_2O_3$ content is preferably 15 to 30% and particularly preferably 17 to 27%. If $Al_2O_3$ is too less, the coefficient of thermal expansion tends to become higher and the chemical durability tends to decrease. On the other hand, if $Al_2O_3$ is too much, the meltability tends to decrease. Furthermore, the viscosity of the molten glass tends to increase, which makes it difficult to clarify the glass and makes it difficult to form the molten glass into shape. In addition, the glass is likely to devitrify.

$Li_2O$ is a constituent of the crystal and a component that has a significant effect on the crystallinity and decreases the viscosity to improve the meltability and the formability. The $Li_2O$ content is preferably 2 to 10%, more preferably 2 to 7%, still more preferably 2 to 5%, and particularly preferably 2 to 4.8%. If the $Li_2O$ content is too small, crystals become difficult to precipitate and the meltability is likely to decrease. Furthermore, the viscosity tends to increase, which makes it difficult to clarify the glass and form the glass into shape. On the other hand, if the $Li_2O$ content is too large, the glass is likely to devitrify.

$Na_2O$ and $K_2O$ are components for decreasing the viscosity to improve the meltability and the formability. Each of the $Na_2O$ content and $K_2O$ content is preferably 0 to 3% and particularly preferably 0.1 to 1%. If the $Na_2O$ content or $K_2O$ content is too large, the glass is likely to devitrify and the coefficient of thermal expansion is likely to become higher. Furthermore, when the glass filler is blended into the resin, the resin may alter the quality.

MgO is a component for controlling the coefficient of thermal expansion. The MgO content is preferably 0 to 5%, more preferably 0.1 to 3%, and particularly preferably 0.3 to 2%. If the MgO content is too large, the glass is likely to devitrify and the coefficient of thermal expansion is likely to become higher.

ZnO is a component for controlling the coefficient of thermal expansion. The ZnO content is preferably 0 to 10%, more preferably 0 to 7%, still more preferably 0 to 3%, and particularly preferably 0.1 to 1%. If the ZnO content is too large, the glass is likely to devitrify.

BaO is a component for decreasing the viscosity to improve the meltability and the formability. The BaO content is preferably 0 to 5% and particularly preferably 0.1 to 3%. If the BaO content is too large, the glass is likely to devitrify.

$TiO_2$ and $ZrO_2$ are components that act as a nucleating agent for precipitating crystals in the crystallization process. The $TiO_2$ content is preferably 0 to 5% and particularly preferably 1 to 4%. The $ZrO_2$ content is preferably 0 to 4% and particularly preferably 0.1 to 3%. If the $TiO_2$ content or $ZrO_2$ content is too large, the glass is likely to devitrify.

$P_2O_5$ is a component for promoting phase separation to assist in forming crystal nuclei. The $P_2O_5$ content is preferably 0 to 5% and particularly preferably 0.1 to 4%. If the $P_2O_5$ content is too large, the phase separation excessively occurs, so that the light transmittance is likely to become lower.

$SnO_2$ is a component acting as a fining agent. The $SnO_2$ content is preferably 0 to 2.5% and particularly preferably 0.1 to 2%. If the $SnO_2$ content is too large, the glass is likely to devitrify and the light transmittance is likely to become lower.

In addition to the above components, $B_2O_3$, CaO, SrO, and so on may be appropriately incorporated into the glass filler without impairing the effects of the present invention.

In each of the glass composition A and the glass composition B, the content of each of lead, mercury, chromium, cadmium, fluorine, and arsenic in the glass composition is preferably 0.01% by mass or less for environmental reasons. Furthermore, from the viewpoint of preventing the decrease in light transmittance, the content of $Fe_2O_3$, NiO, and CuO in the glass composition is, in total, preferably 1% or less, more preferably 0.75% or less, and particularly preferably 0.5% or less and the content of $TiO_2$, $WO_3$, $La_2O_3$, $Gd_2O_3$, and $Bi_2O_3$ is, in total, preferably 5% or less, more preferably 2.5% or less, and particularly preferably 1% or less.

The coefficient of thermal expansion of the glass filler according to the present invention at −40 to 50° C. is preferably $60\times10^{-7}/°$ C. or less, more preferably $50\times10^{-7}/°$ C. or less, and particularly preferably $40\times10^{-7}/°$ C. or less. If the coefficient of thermal expansion of the glass filler is too high, the effect of lowering the coefficient of thermal expansion of the resultant three-dimensional modeled object becomes difficult to achieve. Note that the glass filler having the above glass composition B can reach a coefficient of thermal expansion as low as, for example, $5\times10^{-7}/°$ C. or less, even $3\times10^{-7}/°$ C. or less, and particularly even $2\times10^{-7}/°$ C. or less, by crystal precipitation.

The specific surface area of the glass filler is preferably three times or less, more preferably 2.5 times or less, and particularly preferably twice or less a theoretical specific surface area represented by the equation below. Thus, the surface asperity of the glass filler becomes small, so that the fluidity of the resin composition can be easily increased. When the glass filler is subjected to fire polishing or like processing, the surface roughness can be reduced to decrease the specific surface area. Although no particular limitation is placed on the shape of the glass filler, the shape is preferably approximately spherical from the viewpoint of decreasing the specific surface area.

$$\text{Theoretical specific surface area } (m^2/g)=6/(\text{density } (g/cm^3)\times\text{average particle size } D_{50} (\mu m)).$$

The specific surface area of the glass filler is preferably 0.1 to 5 $m^2/g$, more preferably 0.5 to 4 $m^2/g$, and particularly preferably 0.75 to 3 $m^2/g$. If the specific surface area of the glass filler is too small, the particle diameter is likely to become large, so that the fluidity of the resin composition is likely to decrease. On the other hand, if the specific surface area of the glass filler is too large, the fluidity of the resin composition is likely to decrease and bubbles at the interface become difficult to remove. Furthermore, the mechanical strength of the resultant three-dimensional modeled object is likely to decrease.

The average particle size $D_{50}$ of the glass filler is preferably 1 to 500 μm, more preferably 1.5 to 100 μm, still more preferably 2 to 50 μm, and particularly preferably 2.5 to 20 μm. As the average particle size $D_{50}$ of the glass filler decreases, the filling rate thereof can be higher, but the fluidity of the curable resin tends to decrease and bubbles at the interface tend to become more difficult to remove. On the other hand, as the average particle size $D_{50}$ of the glass filler increases, the filling rate is more likely to become lower.

In the present invention, the average particle size $D_{50}$ indicates a primary particle diameter at 50% cumulative volume equivalent to a median diameter and refers to a value measured by a laser diffraction particle size distribution measurement device.

The light transmittance of the glass filler at a wavelength of 400 nm is preferably 5% or more, more preferably 10% or more, still more preferably 30% or more, even more preferably 50% or more, and particularly preferably 70% or more. Particularly in the case of stereolithography, if the light transmittance of the glass filler at a wavelength of 400 nm is too low, active energy rays has difficulty in penetrating into the resin composition, so that the resin composition becomes less curable.

No particular limitation is placed on the density of the glass filler and it may be appropriately adjusted depending on the intended use. For example, the density of the glass filler is appropriately adjusted preferably in a range of 2.4 to 4 $g/cm^3$ and particularly preferably in a range of 2.5 to 3.5 $g/cm^3$.

No particular limitation is placed on the refractive index nd and Abbe's number vd of the glass filler and they may be appropriately adjusted depending on the resin used. For example, the refractive index nd of the glass filler is appropriately adjusted preferably in a range of 1.40 to 1.75 and the Abbe's number vd of the glass filler is appropriately adjusted preferably in a range of 30 to 70.

The glass filler is preferably treated at the surface with a silane coupling agent. When the glass filler is treated with a silane coupling agent, the bonding force between the glass filler and the curable resin can be increased, so that a three-dimensional modeled object having better mechanical strength can be obtained. In addition, the glass filler and the curable resin can blend well together, so that bubbles at the interface can be reduced. Furthermore, the weather resistance of the glass filler can be increased. Preferred examples of silane coupling agents include amino silanes, epoxy silanes, and acryl silanes. The silane coupling agent is preferably appropriately selected depending on the curable resin used. For example, when an unsaturated vinyl compound is used as the photocurable resin, an acryl silane coupling agent is most preferably used. When an epoxy compound is used as the photocurable resin, an epoxy silane coupling agent is preferably used.

Furthermore, in order to increase the mechanical strength, oxide nanoparticles may be incorporated in a proportion of 1% by volume or less into the resin composition. The type of oxide nanoparticles that can be used is $ZrO_2$, $Al_2O_3$, $SiO_2$ or the like. These types of oxide nanoparticles also have the effect of increasing the wettability of the glass filler with resin to reduce the viscosity of the resin composition. The average particle size of the oxide nanoparticles is preferably 1 to 1000 nm, more preferably 2.5 to 750 nm, and particularly preferably 5 to 500 nm. If the average particle size of the oxide nanoparticles is too small, the effect of increasing the mechanical strength is difficult to achieve. If the average particle size of the oxide nanoparticles is too large, the effect of reducing the viscosity of the resin composition is difficult to achieve. Furthermore, because of scattering caused by a difference in refractive index between the oxide nanoparticles and the resin, the light transmittance of the resin composition is likely to become lower.

Next, a description will be given of an example of a method for producing a three-dimensional modeled object according to the present invention. Specifically, a description will be given of a method for producing a three-dimensional modeled object using a resin composition containing a photocurable resin. The resin composition is as described previously and further explanation thereof will be accordingly omitted here.

First, one liquid layer made of a photocurable resin composition is prepared. For example, a modeling stage is provided in a tank filled with a liquid photocurable resin composition and the top surface of the platform is positioned at a desired depth (for example, about 0.2 mm) from the liquid level. By doing so, a liquid layer can be prepared on top of the platform.

Next, the liquid layer is irradiated with active energy rays, for example, an ultraviolet laser to cure the photocurable resin, thus forming a cured layer having a predetermined pattern. Besides ultraviolet rays, visible light rays, infrared rays or other laser light can be used as the active energy rays.

Subsequently, a new liquid layer made of a photocurable resin composition is prepared on top of the formed cured layer. For example, a new liquid layer can be prepared by lowering the above-described modeling stage by one layer thickness to introduce the photocurable resin on top of the cured layer.

Thereafter, the new liquid layer prepared on top of the cured layer is irradiated with active energy rays to form a new cured layer continuous with the previous cured layer.

By repeating the process thus far described, cured layers are successively deposited to obtain a predetermined three-dimensional modeled object.

The three-dimensional modeled object obtained by the production method according to the present invention is suitable, for example, as a positioning member in various measurement devices or a component of a thermal regulator.

EXAMPLES

A description will be given below of the resin composition for three-dimensional modeling according to the present invention with reference to examples. Table 1 shows examples of the present invention and comparative examples.

(Preparation of Photocurable Resin)

First, isophorone diisocyanate, morpholine acrylamide, and dibutyltin dilaurate were heated in an oil bath. Next, a liquid obtained by uniformly mixing and dissolving methylhydroquinone into glycerol monomethacrylate monoacrylate was introduced into the oil bath, followed by mixing with stirring to allow the mixture to undergo reaction. Also added to the mixture was a 4 mol propylene oxide adduct of pentaerythritol (a substance in which 1 mol propylene oxide was added to each of four hydroxyl groups of pentaerythritol), followed by reaction, thus producing a reaction product containing an urethane acrylate oligomer and morpholine acrylamide.

Added to the obtained reaction product were morpholine acrylamide and dicyclopentanyl diacrylate. Further added to the mixture was 1-hydroxycyclohexyl phenyl ketone (photopolymerization initiator), thus obtaining a clear, colorless acrylic photocurable resin. The acrylic photocurable resin exhibited a viscosity of 1 Pa·s and a refractive index nd of 1.5103 after cured.

(Preparation of Glass Filler)

First, raw materials were formulated to give each composition shown in Table 1 and melted at 1500 to 1600° C. for four to eight hours. The molten glass was formed into a film by forming rolls and then ground to produce glass powder having an average particle size $D_{50}$ of 5 μm. The obtained glass powder was exposed to the flame of an oxygen burner to form it into spherical particles. Thereafter, the spherical particles were classified to obtain a glass filler (glass beads) having an average particle size $D_{50}$ of 5 μm. The obtained glass filler was measured in terms of various properties in the following manners.

The softening point was measured using the fiber elongation method.

The density was measured by the Archimedes' method.

The refractive index nd and the Abbe's number vd were measured using a precision refractometer (KPR-2000 manufactured by Shimadzu Device Corporation).

The light transmittance at a wavelength of 400 nm was measured by preparing a sample having a thickness of 1 mm±0.01 mm and mirror-polished on both sides and using a spectro-photometer (UV-3100 manufactured by Shimadzu Corporation).

The coefficient of thermal expansion was measured using a dilatometer.

(Preparation of Resin Composition for Stereolithography)

A photocurable resin and a glass filler were weighed to give 70% by volume and 30% by volume, respectively, and kneaded with a triple roll to obtain a pasty resin composition in which the glass filler was homogeneously dispersed.

The obtained pasty resin composition was cast into a mold of 30 mm inside diameter square made of Teflon (registered trademark). Thereafter, the pasty resin composition was irradiated with light having a wavelength of 364 nm at 500 mW for 10 seconds and then annealed at 80° C., thus obtaining a three-dimensional modeled object. The obtained three-dimensional modeled object was measured in terms of coefficient of thermal expansion. The results are shown in Table 1.

As seen from Table 1, the three-dimensional modeled objects in Examples 1 and 2 exhibited a coefficient of thermal expansion of $690 \times 10^{-7}$/° C. or less. On the other hand, the three-dimensional modeled objects in Comparative Examples 1 and 2 exhibited a coefficient of thermal expansion as high as $750 \times 10^{-7}$/° C. or more.

TABLE 1

|  | Ex. 1 | Ex. 2 | Comp. Ex. 1 | Comp. Ex. 2 |
| --- | --- | --- | --- | --- |
| $SiO_2$ | 62.5 | 66.3 | 51.7 | 69 |
| $Al_2O_3$ | 17 | 22.4 | 14 | 2 |
| $B_2O_3$ | 10.5 |  | 7 |  |
| MgO | 1.5 | 0.5 | 0.4 | 3 |
| CaO | 7.6 |  | 24.9 | 10 |
| SrO | 0.9 |  | 0.2 | 0.8 |
| BaO |  |  |  | 0.9 |
| $Li_2O$ |  | 4.3 |  |  |
| $Na_2O$ |  | 0.5 | 0.6 | 13 |
| $K_2O$ |  | 0.3 | 0.1 | 1 |
| $P_2O_5$ |  | 1.4 |  |  |
| $ZrO_2$ |  | 2.3 |  |  |
| $TiO_2$ |  | 2 | 0.5 | 0.1 |
| $Fe_2O_3$ |  |  | 0.3 | 0.2 |
| $F_2$ |  |  | 0.3 |  |
| Softening Point (° C.) | 970 | 1130 | 860 | 690 |
| Density (g/cm³) | 2.38 | 2.52 | 2.64 | 2.53 |
| Refractive Index nd | 1.5097 | 1.5432 | 1.566 | 1.522 |
| Abbe's number vd | 62.6 | 57.4 | 58.5 | 58.8 |
| Light Transmittance (%) | 93 | 90 | 76 | 90 |
| CTE (×10⁻⁷/° C.) | 33.4 | −13 | 60.8 | 89.4 |
| CTE of 3D modeled object (×10/° C.) | 690 | 670 | 750 | 760 |

The invention claimed is:

1. A resin composition containing:
a curable resin and a glass filler, the glass filler having a coefficient of thermal expansion of $60 \times 10^{-7}/°$ C. or less at −40 to 50° C. and compositionally containing 90% by mass or less $SiO_2$, 5 to 50% by mass $B_2O_3$, and 1 to 40% by mass of at least one selected from the group consisting of MgO, CaO, SrO, and BaO; wherein
the glass filler has a light transmittance of 5% or more at a wavelength of 400 nm; and
the resin composition contains, in % by volume, the curable resin in a proportion of 30 to 99% and the glass filler in a proportion of 1 to 70%.

2. The resin composition for according to claim 1, wherein the glass filler has a specific surface area three times or less a theoretical specific surface area represented by the following equation:

$$\text{theoretical specific surface area (m}^2/\text{g)} = 6/(\text{density (g/cm}^3) \times \text{average particle size } D50 \text{ (μm)}).$$

3. The resin composition according to claim 1, wherein the glass filler is approximately spherical.

4. The resin composition according to claim 1, wherein the glass filler compositionally contains, in % by mass, 30 to 85% $SiO_2$, 0 to 30% $Al_2O_3$, 5 to 50% $B_2O_3$, 1 to 40% by mass of at least one selected from the group consisting of MgO, CaO, SrO, and BaO, and 0.01 to 10% $Li_2O+Na_2O+K_2O$.

5. The resin composition according to claim 1, wherein the glass filler has a content of each of lead, mercury, chromium, cadmium, fluorine, and arsenic of 0.01% by mass or less.

6. The resin composition according to claim 1, wherein the glass filler has a softening point of 1200° C. or less.

7. The resin composition according to claim 1, wherein crystals precipitate in the glass filler.

8. The resin composition according to claim 1, wherein the curable resin is a photocurable resin or a thermosetting resin.

9. A method for producing a three-dimensional modeled object, the method comprising: selectively irradiating a liquid layer made of a resin composition with active energy rays to form a cured layer having a predetermined pattern; forming a new liquid layer on top of the cured layer, followed by irradiation of active energy rays to form a new cured layer having a predetermined pattern continuous with the cured layer; and repeating deposition of the cured layers one on top of another until a predetermined three-dimensional modeled object is obtained, wherein the resin composition for three-dimensional modeling according to claim 1 is used as the resin composition.

10. A resin composition containing:
a curable resin and a glass filler, the glass filler having a coefficient of thermal expansion of $60 \times 10^{-7}/°$ C. or less at −40 to 50° C. and compositionally containing 90% by mass or less $SiO_2$, and 1 to 40% by mass of at least one selected from the group consisting of MgO, CaO, SrO, and BaO; wherein
the glass filler has a light transmittance of 5% or more at a wavelength of 400 nm; and
the resin composition contains, in % by volume, the curable resin in a proportion of 30 to 99% and the glass filler in a proportion of 1 to 70%.

* * * * *